United States Patent
Oh et al.

(10) Patent No.: US 6,687,502 B2
(45) Date of Patent: Feb. 3, 2004

(54) METHOD FOR MANAGING CHANNEL STATE IN EXTENDED TRAFFIC REGION BASE STATION

(75) Inventors: Sung-Won Oh, Ichon-shi (KR); Hyun-Ah Kwon, Ichon-shi (KR)

(73) Assignee: Hyundai Electronics Industries (KR)

( * ) Notice: Subject to any disclaimer, the term of this patent is extended or adjusted under 35 U.S.C. 154(b) by 499 days.

(21) Appl. No.: 09/815,534

(22) Filed: Mar. 21, 2001

(65) Prior Publication Data

US 2001/0024954 A1 Sep. 27, 2001

(30) Foreign Application Priority Data

Mar. 21, 2000 (KR) ....................................... 2000-14279

(51) Int. Cl.[7] .............................................. H04Q 7/20
(52) U.S. Cl. ...................................... 455/443; 455/450
(58) Field of Search ................................. 455/443, 450

(56) References Cited

U.S. PATENT DOCUMENTS

| | | | |
|---|---|---|---|
| 5,797,096 A | 8/1998 | Lupien et al. | 455/433 |
| 5,867,789 A | 2/1999 | Olds et al. | 455/453 |
| 6,006,110 A | 12/1999 | Raleigh | 455/561 |
| 6,134,231 A | 10/2000 | Wright | 370/348 |
| 2001/0024954 A1 * | 9/2001 | Oh et al. | 455/443 |
| 2002/0128015 A1 * | 9/2002 | Ye | 455/450 |

* cited by examiner

*Primary Examiner*—William Cumming
(74) *Attorney, Agent, or Firm*—Baker Botts LLP

(57) ABSTRACT

A method for managing states of a pair of channel elements including a normal channel element for a normal traffic region and an extended channel element for an extended traffic region in an extended traffic region base station that includes a state management block (SMB), a call processing block (CPB), a resource allocation block (RAB), a statistics processing block (SPB) and a base station manager (BSM), includes the steps of: by each of the normal channel element and the extended channel element, reporting current states of each of the normal channel element and the extended channel element to the SMB, wherein the current state is one of an abnormal state, a loading state, an idle state and a busy state; by the SMB, combining the current states to thereby generate a combined state; and by the SMB, reporting the combined state to a set of the CPB and the RAB and a set of the SPB and the BSM.

12 Claims, 3 Drawing Sheets

METHOD FOR MANAGING CHANNEL STATE IN EXTENDED TRAFFIC REGION BASE STATION

FIELD OF THE INVENTION

This invention relates to a method for managing a channel state in an extended region base station in a mobile communication system; and more particularly, to a method for managing a channel state in an extended region base station in a mobile communication system, wherein at least two channel states are reported from each of at least two channel elements.

DESCRIPTION OF THE PRIOR ART

Generally, in a code division multiple access (CDMA) mobile communication system including a mobile station (MS), a base transceiver station (BTS), a base station controller (BSC) and a mobile switching center (MSC), a traffic region is restricted within a cell radius of 60 km due to a technical limitation of a cell site modem (CSM) ASIC (application specification integrated circuit). Also, depending on capacity of a mobile communication system, a cell radius of approximately 7 km is enough for the traffic region to provide a communication service in the center of a city.

However, in case a service needs to be provided in a coastal area or an island area where the BTS is hard to install or a country area where a service area is too broad and a subscriber density is low, there is caused a problem that it is not avoidable to install unnecessary BTSs.

To extend the traffic region in the conventional way, a pair of CSM ASICs including two CSM ASICs should be used. In this case, one CSM ASIC is used for covering a normal region meaning a region within a cell radius of 60 km and the other ASIC is used for an extended region meaning a region within a cell radius of 60 km to 120 km. Simple adjustment of hardware and control of software are needed to perform the traffic region extension without redesigning the CSM ASIC.

As described above, overall traffic region can be extended by including a plurality of normal regions and extended regions that are covered by corresponding pair of the CSM ASICs. When the MS moves from the normal region to the extended region and vice versa, there is needed a handoff region where all of two CSM ASICs can perform a phase tracking of a reverse channel signal in order to perform good call processing between the regions without traffic disconnection.

In a conventional BTS for a single traffic region, one forward/reverse traffic channel is assigned to one CSM. In this case, a way of managing a channel state in the BTS for the single traffic region is as follows.

Each channel element corresponding to each of a plurality of CSMs classifies a state of the channel element into an abnormal state, a loading state, an idle state and a busy state, and reports a current state of itself to a state management block (SMB) of a BTS control processor (BCP) that is a higher-leveled control processor of the channel element.

Then, the BCP reports the current state of the channel element to a call control processor (CCP) of the BSC that is a higher-leveled control processor of the BCP.

In the above four states of the channel element, the abnormal state represents a state where the channel element is not operated normally; the loading state represents an initialization state of the channel element; the idle state represents a state where an normal initialization is performed and then the channel element stands by for a call assignment; and the busy state represents a traffic state.

The SMB of the BCP/CCP manages the reported state of the channel element and provides database that is needed to be used at a call processing block (CPB), a statistics processing block (SPB) and a resource allocation block (RAB).

However, in a BTS for an extended traffic region where the traffic region is divided into the normal region, the handoff region and the extended region, the call processing should be performed under an assumption that a pair of fixed physical channels is a logical channel.

The conventional way for managing the channel state by which one CSM is used for the call processing in the BTS for the single traffic region, causes lots of problems such as traffic disconnection in providing an extended traffic region service to thereby be unable to operate the BTS for the extended traffic region.

SUMMARY OF THE INVENTION

It is an object of the present invention to provide a method for managing states of a pair of channel elements including a normal channel element for a normal traffic region and an extended channel element for an extended traffic region in an extended traffic region base station that includes a state management block (SMB), a call processing block (CPB), a resource allocation block (RAB), a statistics processing block (SPB) and a base station manager (BSM) in order to enable operate the extended traffic region base station.

In accordance with an aspect of the present invention, there is provided a method for managing states of a pair of channel elements including a normal channel element for a normal traffic region and an extended channel element for an extended traffic region in an extended traffic region base station that includes a state management block (SMB), a call processing block (CPB), a resource allocation block (RAB), a statistics processing block (SPB) and a base station manager (BSM), including the steps of: by each of the normal channel element and the extended channel element, reporting current states of each of the normal channel element and the extended channel element to the SMB, wherein the current state is one of an abnormal state, a loading state, an idle state and a busy state; by the SMB, combining the current states to thereby generate a combined state; and by the SMB, reporting the combined state to a set of the CPB and the RAB and a set of the SPB and the BSM.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
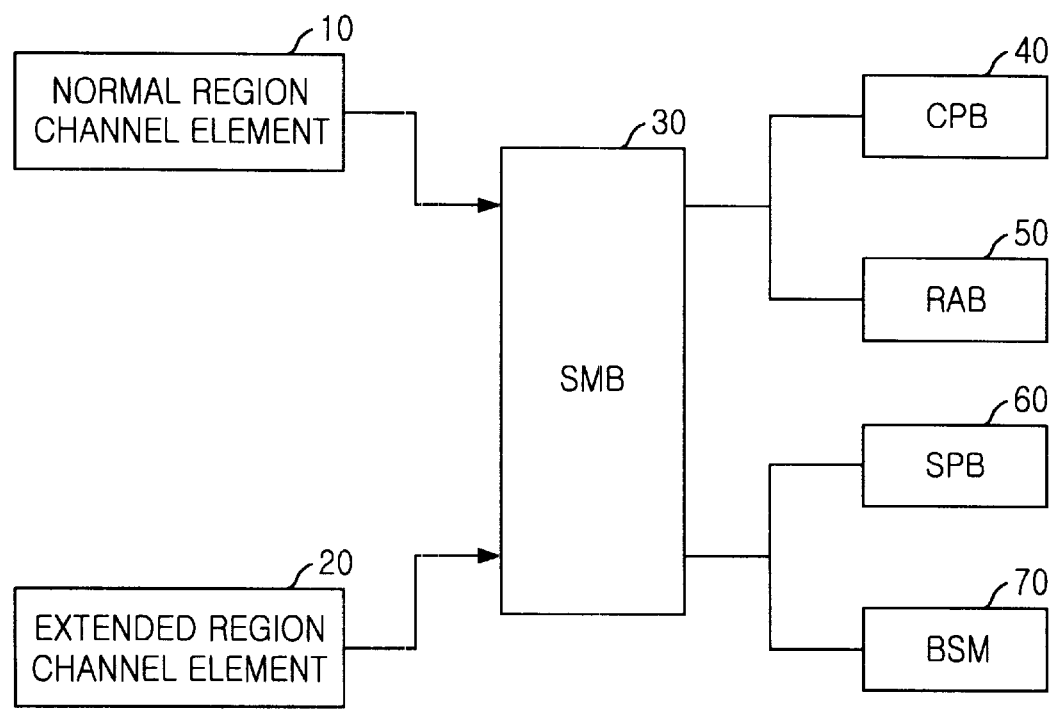
FIG. 1 is a block diagram illustrating a procedure of performing a method for managing a channel state of an extended traffic region base transceiver station (BTS) in accordance with the present invention.

FIG. 1 is a block diagram illustrating a procedure of performing a method for managing a channel state of an extended traffic region base transceiver station (BTS) in accordance with the present invention.

Reference numerals 10 and 20 denote a normal region channel element and an extended region channel element, respectively. The normal region channel element 10 covers a normal region in an extended traffic region BTS and the extended region channel element 20 covers an extended region in the extended traffic region BTS.

A reference numeral 30 denotes a state management block (SMB) of the BTS/a base station controller (BSC), which receives reports of states of each channel element from the normal region channel element and the extended region channel element and performs combining and processing the reported states of each channel element.

Reference numerals 40, 50, 60 and 70 denote a call processing block (CPB), a resource allocation block (RAB), a statistics processing block (SPB) and a base station manager (BSM). The CPB 40 performs a call processing according to the combined and processed state of the channel element; the RAB 50 performs a resource allocation according to the combined and processed state of the channel element; the SPB 60 performs a statistics processing according to the combined and processed state of the channel element; and the BSM 70 manages a system according to the combined and processed state of the channel element.

Figure 2:
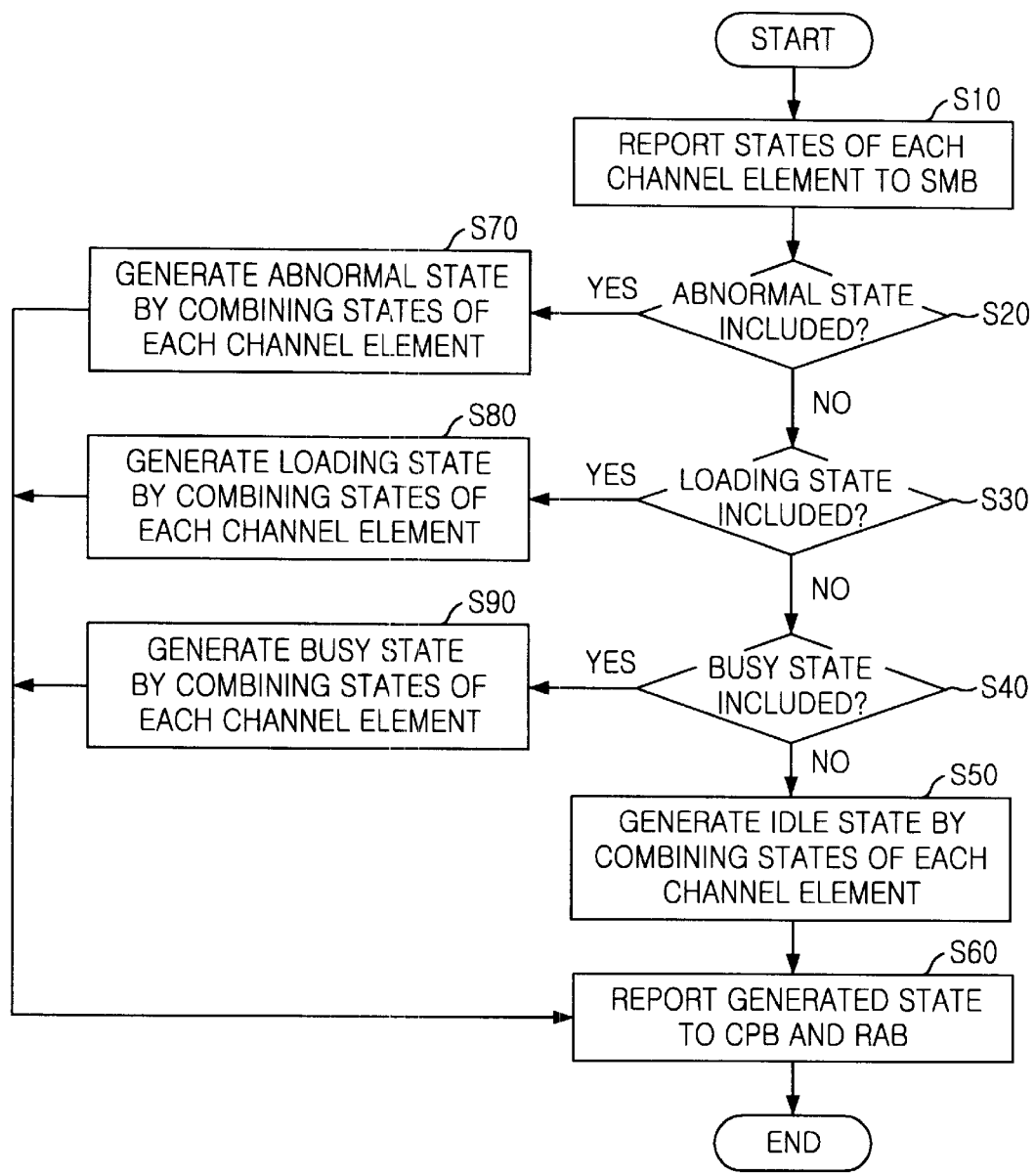
FIG. 2 is a flow chart illustrating a method for managing a channel state and reporting the channel state to a call processing block (CPB)/a resource allocation block (RAB) in an extended traffic region base transceiver station (BTS) in accordance with the present invention.

FIG. 2 is a flow chart illustrating a method for managing a channel state and reporting the channel state to a call processing block (CPB)/a resource allocation block (RAB) in an extended traffic region base transceiver station (BTS) in accordance with the present invention.

Figure 3:
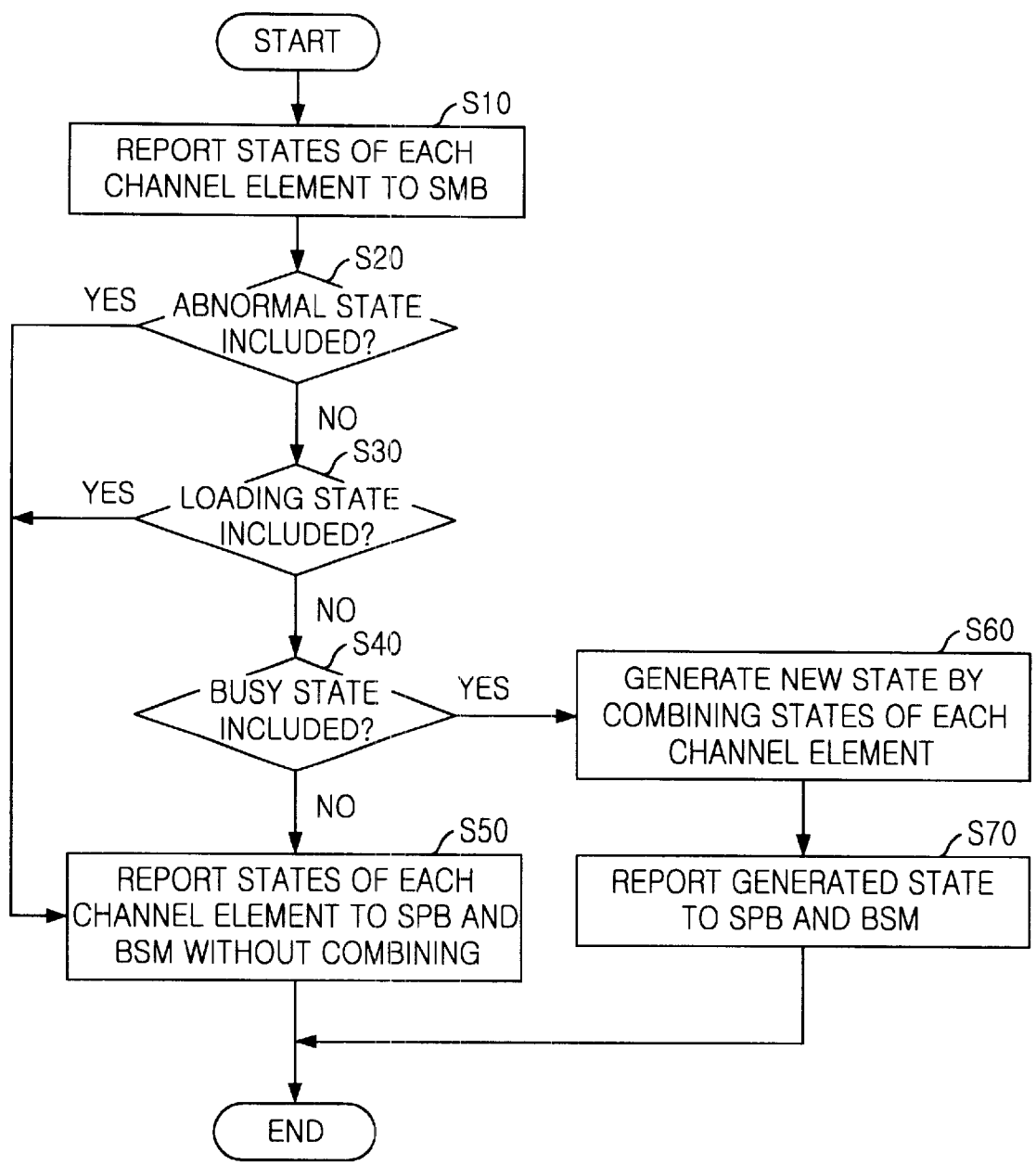
FIG. 3 is a flow chart illustrating a method for managing a channel state and reporting the channel state to a statistics processing block (SPB)/a base station manager (BSM) in an extended traffic region base transceiver station (BTS) in accordance with the present invention.

FIG. 3 is a flow chart illustrating a method for managing a channel state and reporting the channel state to a statistics processing block (SPB)/a base station manager (BSM) in an extended traffic region base transceiver station (BTS) in accordance with the present invention.

Referring to FIG. 2 and FIG. 3, to perform the method for managing the channel state of the extended traffic region base transceiver station (BTS) in accordance with the present invention, following requirements should be satisfied.

In configuring a logical channel as a pair of fixed physical channel elements including a normal region channel element and an extended region channel element, first, the CPB 40 should not be modified in performing a good call processing; second, the RAB 50 should not be modified in performing an allocation and a release of the resource; third, a report routine should not be modified in reporting the states of each of the normal region channel element and the extended region channel element; and fourth, states of a physical channel and a logical channel are grasped correctly in performing the statistics processing at the SPB 60 and in performing a system display at the BSM 70.

As described above, to provide an extended traffic region service, there is needed a procedure of assuming that the pair of physical channel elements including two or more channel elements is the logical channel, because one channel should be allocated to a mobile station.

In a relevant logical viewpoint, to perform functions related to the traffic, for example, the call processing, the allocation/release of the resource or the like, the SMB 30 needs to perform combining the states of each of the normal region channel element and the extended region channel element that the pair of the physical channel elements includes, to thereby allocate the logical channel that is configured using the pair of the physical channel elements to the mobile station.

In this case, the call should be allocated when both the normal region channel element and the extended region channel element that the pair of the channel elements includes, are initialized normally. However, if the call is allocated as only one of both channel elements is initialized normally, a traffic disconnection may happen in a boundary region while a movement between the normal region and the extended region proceeds.

Also, even if only one of both channel elements is in the busy state, the state of the pair of the channel elements is set up to the busy state. However, in this case, respective different calls are allocated to the pair of the channel elements and the traffic disconnection may happen in the boundary region while the movement between the normal region and the extended region proceeds. For example, if the normal region channel element is in the busy state, a normal call is allocated and if the extended region channel element is in the busy state, a extend call is allocated.

Accordingly, to avoid the traffic disconnection, all of the normal region channel element and the extended region channel element need to be in the busy state.

After combining the states of each of the normal region channel element and the extended region channel element and generating the combined state, the SMB 30 performs reporting the combined state to the CPB 40, RAB 50, the SPB 60 and the BSM 70.

In reporting the combined state to the CPB 40 and the RAB 50, the SMB 30 doesn't have to know states of both of the normal region channel element and the extended region channel element. That is to say, knowledge of the state of one of both channel elements enables the SMB 30 to generate the combined state.

However, when reporting the combined state to the SPB 60 and the BSM 70, the SMB 30 should know states of both channel elements in order that a statistics process can be performed at the SPB 60 and a system display can be performed at the BSM 70. Especially, it is necessary to acquire information about which region a call setup for the mobile station is performed in and which region the mobile station is located in. Collecting statistics on a success rate of the traffic connection or the handoff performance is based on the acquired information. Also, the BSM 70 can know which aspect a current busy state is in, based on the acquired information.

In case of reporting the combined state to the SPB 60 and the BSM 70, when the combined state of both channel elements is not indicating the busy state, the SMB 30 performs reporting the respective state as reported from each channel element.

Referring to FIG. 1 and FIG. 2, at the step S10, a pair of channel elements including the normal and extended region channel elements reports to the SMB 30 current states of each of the normal and extended region channel elements 10 and 20, each element being in one state of an abnormal state, a loading state, an idle state and a busy state.

The abnormal state refers to a state wherein the channel element is not operated normally. The loading state refers to a state wherein the channel element is initialized. The idle state refers to a state wherein the channel element stands by for a call assignment after a normal initialization. The busy state refers to a traffic state.

To combine the reported current states of each of the normal region channel element 10 and the extended region channel element 20, at the step S20, the SMB 30 determines if the reported current states of each of both channel elements includes the abnormal state, and if not, the logic flow proceeds to step S30, otherwise the logic flow proceeds to step S70.

At the step S30, the SMB 30 determines if the reported current states of each of both channel elements includes the loading state, and if not, the logic flow proceeds to step S40, otherwise the logic flow proceeds to step S80.

At the step S40, the SMB 30 determines if the reported current states of each of both channel elements includes the busy state, and if not, the logic flow proceeds to step S50, otherwise the logic flow proceeds to step S90.

At the step S50, the SMB 30 combines the reported current states of each of the normal region channel element 10 and the extended region channel element 20, to thereby generate the idle state.

At the step S60, the SMB 30 reports the state that is generated at the SMB 30 by combining the reported states to the CPB 40 and the RAB 50.

At the step S70, the SMB 30 combines the reported current states of each of the normal region channel element 10 and the extended region channel element 20, to thereby generate the abnormal state.

At the step S80, the SMB 30 combines the reported current states of each of the normal region channel element 10 and the extended region channel element 20, to thereby generate the loading state.

At the step S90, the SMB 30 combines the reported current states of each of the normal region channel element 10 and the extended region channel element 20, to thereby generate the busy state.

As shown in FIG. 1 and FIG. 3, at the step S10, the pair of channel elements including the fixed normal and extended region channel elements reports to the SMB 30 current states of each of the fixed normal and extended region channel elements 10 and 20, each element being in one state of the abnormal state, the loading state, the idle state and the busy state.

To combine the reported current states of each of the normal region channel element 10 and the extended region channel element 20, at the step S20, the SMB 30 determines if the reported current states of each of both channel elements includes the abnormal state, and if not, the logic flow proceeds to step S30, otherwise the logic flow proceeds to step S50.

At the step S30, the SMB 30 determines if the reported current states of each of both channel elements includes the loading state, and if not, the logic flow proceeds to step S40, otherwise the logic flow proceeds to step S50.

At the step S40, the SMB 30 determines if the reported current states of each of both channel elements includes the busy state, and if not, the logic flow proceeds to step S50, otherwise the logic flow proceeds to step S60.

At the step S50, the SMB 30 reports the current states of each channel element to the SPB 60 and the BSM 70 without combining the same.

At the step S60, the SMB 30 combines the current states of each channel element to thereby generate a combined state.

In other words, if the current states include the busy state for the normal channel element and the idle state for the extended channel element, the SMB 30 combines the current states to thereby generate a combined state indicating that a call is set up in the normal region.

If the current states include the idle state for the normal channel element and the busy state for the extended channel element, the SMB 30 combines the current states to thereby generate a combined state indicating that a call is set up in the extended region.

If the current states of each of the normal channel element and the extended channel element shift from the busy state and the idle state to the busy state and the busy state, the SMB 30 combines the current states to thereby generate a combined state indicating that a handoff is being performed from the normal region to the extended region.

If the current states of each of the normal channel element and the extended channel element shift from the idle state and the busy state to the busy state and the busy state, the SMB 30 combines the current states to thereby generate a combined state indicating that the handoff is being performed from the extended region to normal the region.

If the current states of each of the normal channel element and the extended channel element shift from the busy state and the busy state to the busy state and the idle state, the SMB 30 combines the current states to thereby generate a combined state indicating that the call is being shifted from a handoff region to the normal region.

If the current states of each of the normal channel element and the extended channel element shift from the busy state and the busy state to the idle state and the busy state, the SMB 30 combines the current states to thereby generate a combined state indicating that the call is being shifted from the handoff region to the extended region.

At the step S70, the SMB 30 reports the combined state of states of each channel element to the SPB 60 and the BSM 70.

As described above, by performing the method for managing states of a pair of channel elements in accordance with the present invention, there are provided a couple of benefits that it is possible to operate the extended traffic region base station with a minimum system modification and to manage the system more efficiently by providing statistics of a traffic success rate, a handoff success rate or the like, based on which region the call is set up in or which region the mobile station is located in.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for managing states of a pair of channel elements including a normal channel element for a normal traffic region and an extended channel element for an extended traffic region in an extended traffic region base station wherein the extended traffic region base station includes a state management block (SMB), a call processing block (CPB), a resource allocation block (RAB), a statistics processing block (SPB) and a base station manager (BSM), the method comprising the steps of:

a) by each of the normal channel element and the extended channel element, reporting current states of each of the normal channel element and the extended channel element to the SMB, wherein the current state is one of an abnormal state, a loading state, an idle state and a busy state;

b) by the SMB, combining the current states to thereby generate a combined state; and c) by the SMB, reporting the combined state to a set of the CPB and the RAB and a set of the SPB and the BSM.

2. The method as recited in claim 1, wherein the current state is one of an abnormal state, a loading state, an idle state and a busy state.

3. The method as recited in claim 2, wherein the step b) further includes the steps of:
  d) by the SMB, reporting the current states to the SPB and the BSM without combining the current states.

4. The method as recited in claim 3, wherein the step b) includes the steps of:
  b1) in reporting to the set of the CPB and the RAB, determining if the current states include the abnormal state;
  b2) if the current states don't include the abnormal state, determining if the current states include the loading state;
  b3) if the current states don't include the loading state, determining if the current states include the busy state; and
  b4) if the current states don't include the busy state, combining the current states to thereby generate the idle state as the combined state.

5. The method as recited in claim 4, wherein the step b2) further includes the step of:
  b5) if the current states include the abnormal state, combining the current states to thereby generate the abnormal state as the combined state.

6. The method as recited in claim 5, wherein the step b3) further includes the step of:
  b6) if the current states include the loading state, combining the current states to thereby generate the loading state as the combined state.

7. The method as recited in claim 6, wherein the step b4) further includes the step of:
  b7) if the current states include the busy state, combining the current states to thereby generate the busy state as the combined state.

8. The method as recited in claim 7, wherein the step d) includes the steps of:
  d1) in reporting to the set of the SPB and the BSM, determining if the current states include the abnormal state;
  d2) if the current states don't include the abnormal state, determining if the current states include the loading state;
  d3) if the current states don't include the loading state, determining if the current states include the busy state; and
  d4) if the current states don't include the busy state, by the SMB, reporting the current states of each of the normal channel element and the extended channel element to the SPB and the BSM without combining the current states.

9. The method as recited in claim 8, wherein the step d2) further includes the step of:
  d5) if the current states includes the abnormal state, going to the step d4).

10. The method as recited in claim 9, wherein the step d3) further includes the step of:
  d6) if the current states includes the loading state, going to the step d4).

11. The method as recited in claim 10, wherein the step d4) further includes the steps of:
  d7) if the current states include the busy state, by the SMB, combining the current states of each of the normal channel element and the extended channel element to thereby generate a new combined state; and
  d8) reporting the new combined state to the SPB and the BSM.

12. The method as recited in claim 11, wherein the step d7) includes the steps of:
  d71) if the current states include the busy state for the normal channel element and the idle state for the extended channel element, combining the current states to thereby generate a combined state indicating that a call is set up in the normal region;
  d72) if the current states include the idle state for the normal channel element and the busy state for the extended channel element, combining the current states to thereby generate a combined state indicating that a call is set up in the extended region;
  d73) if the current states of each of the normal channel element and the extended channel element shift from the busy state and the idle state to the busy state and the busy state, combining the current states to thereby generate a combined state indicating that a handoff is being performed from the normal region to the extended region;
  d74) if the current states of each of the normal channel element and the extended channel element, shift from the idle state and the busy state to the busy state and the busy state, combining the current states to thereby generate a combined state indicating that the handoff is being performed from the extended region to normal the region;
  d75) if the current states of each of the normal channel element and the extended channel element shift from the busy state and the busy state to the busy state and the idle state, combining the current states to thereby generate a combined state indicating that the call is being shifted from a handoff region to the normal region; and
  d76) if the current states of each of the normal channel element and the extended channel element shift from the busy state and the busy state to the idle state and the busy state, combining the current states to thereby generate a combined state indicating that the call is being shifted from the handoff region to the extended region.

* * * * *